April 28, 1936.  C. N. MITCHELL  2,038,588
HYDRAULIC CHECK
Original Filed July 11, 1928
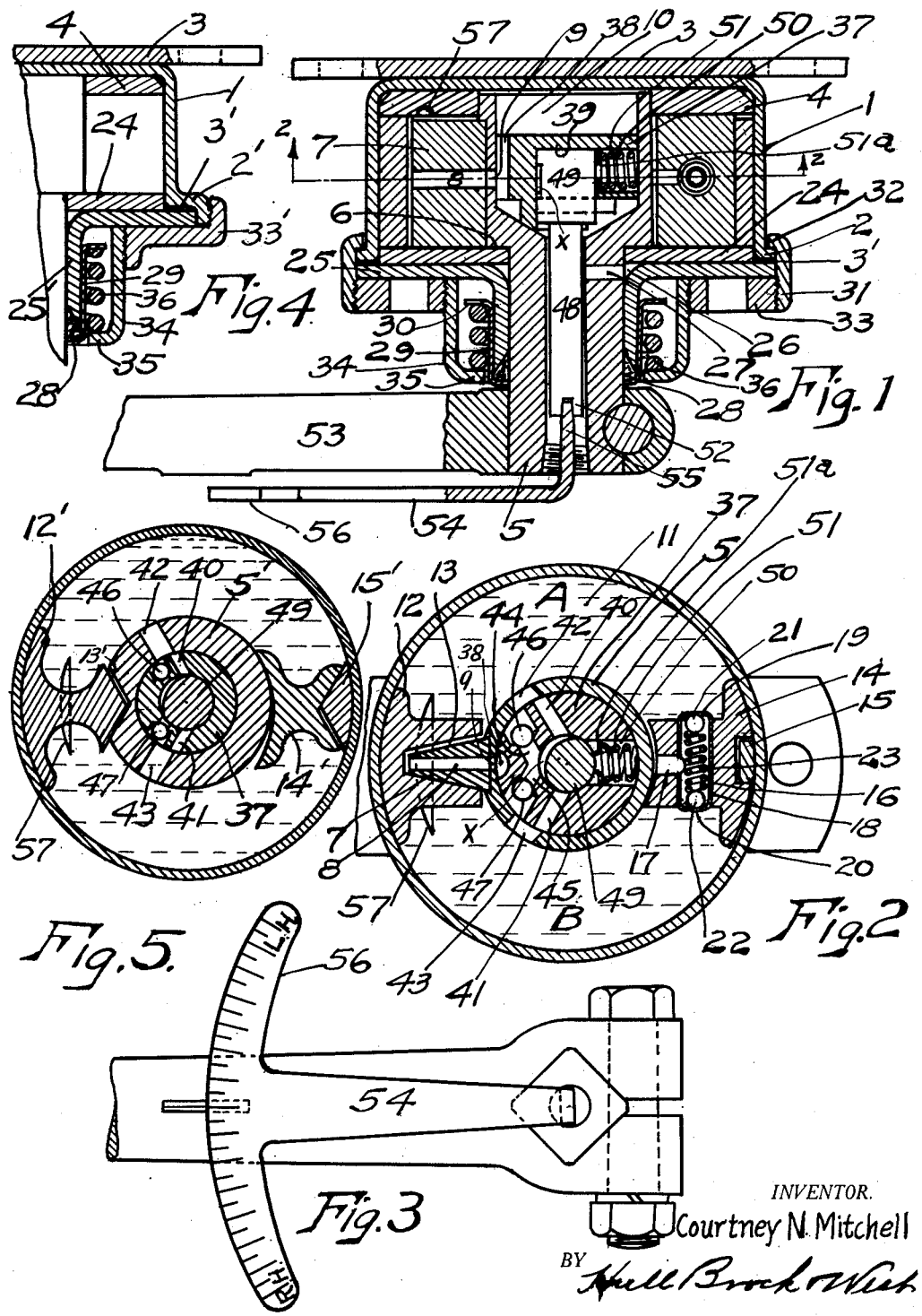
INVENTOR.
Courtney N. Mitchell
BY
ATTORNEY.

Patented Apr. 28, 1936

2,038,588

UNITED STATES PATENT OFFICE 2,038,588

HYDRAULIC CHECK

Courtney N. Mitchell, Berea, Ohio, assignor to Houde Engineering Corporation, Buffalo, N. Y., a corporation of New York Application July 11, 1928, Serial No. 291,829
Renewed February 23, 1934

20 Claims. (Cl. 188—89)

This invention relates to a hydraulic shock absorber and more particularly to that class of shock absorbers adapted for use with motor vehicles, although the device is of general application.

The main object of the invention is to provide a hydraulic check for retarding movement between two relatively movable members and which due to its peculiar construction is readily adapted for adjustment to compensate for manufacturing irregularities in the working parts and also well adapted for quantity production at comparatively low cost.

A further object of the invention is to provide a shock absorber of the character described in which the essential parts are made of metal stampings and which is provided with means for flexing the cover inwardly to vary the clearance between the piston and the walls of the casing.

Another object of the invention is to provide a shock absorber in which the piston is connected with the shaft by means of a trapezoidal key or lug which will permit a slight radial movement of the piston with respect to the shaft to compensate for manufacturing irregularities in the contiguous parts.

Another object of the invention is to provide a shock absorber which is adapted for use on either the left hand or right hand side of a vehicle without substitution of parts.

A further object of the invention is to provide a shock absorber in which the essential parts are formed of metal stampings and which is provided with spaced annular members the working faces of which are disposed in a plane at right angles to the axis of the shaft and housing whereby to provide sharply defined rectangular corners at the opposite ends of the working cylinder.

A still further object of the invention is to provide a shock absorber of the character described which is provided with a plurality of relief valves for relieving excessive pressure in the working cylinder.

Further and more limited objects of the invention will appear as the description proceeds and by reference to the accompanying drawing in which Fig. 1 is a horizontal sectional view disclosing the preferred embodiment of my invention; Fig. 2 is a vertical sectional view on the line 2—2 of Fig. 1; Fig. 3 is a detail view in side elevation disclosing the key or tool for adjusting the device; Fig. 4 is a fragmentary sectional view disclosing a modified form of cylinder and cover plate; and Fig. 5 is a vertical sectional view disclosing a modified form of piston and abutment.

Referring now to the drawing, the reference character 1 designates a cup shaped casing or housing adapted to contain a liquid and which is preferably formed from a metal stamping and provided with an overhanging peripheral flange 2. The casing 1 is preferably welded to a bracket 3 having apertures therein by means of which the device is secured to the body of an automotive vehicle. Arranged within the casing 1 is an annular disk or plate 4 which is preferably pressed into the casing so as to be rigidly connected therewith. The outer or working face of the plate 4 is flat and at right angles to the axis of the casing, the purpose of which will hereinafter appear. Journaled in the casing 1 is a hollow shaft 5 the inner end of which has a bearing in the plate 4 and the outer end of which projects beyond the outer end of the casing. The shaft 5 is provided with an annular shoulder 6, the purpose of which will hereinafter appear. Rigidly connected with the shaft 5 is a trapezoidal key 7 which is preferably spot welded to the shaft. Extending through the key 7 is a bore or passageway 8 which communicates at its inner end with a bore 9 in the shaft 5. The shaft 5 is hollow and divides the casing into an inner compartment 10 and an outer compartment or compression chamber 11. Arranged within the compression chamber 11 is a piston 12 having a recess 13 therein into which fits the trapezoidal key 7, as shown most clearly in Fig. 2. The recess 13 is larger than the key 7 so as to permit a slight movement of the piston with respect to the key, the purpose of which will hereinafter appear. Also arranged within the compression chamber 11 is an abutment 14 which is keyed to the casing 1 by means of a key 15, the key being of such a size as to permit of a slight movement of the abutment with respect thereto. The abutment 14 is provided with a bore or passageway 16 extending therethrough and a bore or passageway 17 communicating at its inner end with the bore 16 and extending through the abutment at right angles to bore 16.

Arranged within the bore or passageway 16 is a tubular sleeve 18 having oppositely disposed openings 19 and 20 normally closed by outwardly seating ball valves 21 and 22 which are urged to closed position by means of a coil spring 23.

Surrounding the shaft 5 and bearing against the annular shoulder 6 is an annular disk or plate 24 the inner or working face of which is flat and in a plane at right angles to the axis of the casing. For closing the upper end of the casing I provide a cover plate 25 having an upstanding annular portion which surrounds the upper end of the shaft 5. The shape of the cover plate is such as to leave an annular collecting space 26 between the cover plate and the annular disk or plate 24. This space communicates with the interior of the hollow shaft by means of a bore or passageway 27. Surrounding the hollow shaft is a packing 28 which is held in place by means of a metal cap or cover 29 having a peripheral flange 30.

For the purpose of tightly sealing the casing and holding the parts in place I provide an interiorly threaded ring member 31 having an inturned flange 32 thereon adapted to engage behind the peripheral flange 2 on the casing 1. Bearing against the cover plate 25 is an annular plate 33 threadedly secured to the ring member 31. By screwing the plate 33 inwardly the cover plate 25 and annular disk 24 may be rigidly secured in place. In order to prevent leakage of the working fluid under the pressures existing within the casing 1 gasket 3' is provided which is securely clamped between flange 2 and outer portion of cover 25. This gasket is made of a resilient material such as rubber and when pressures are applied by screwing down on clamp ring 33, the gasket material is prevented from flowing outwardly by the inner wall of ring 31 and is prevented from flowing inwardly by disk or ring 24. The gasket section is thus securely enclosed on all sides and sufficiently high pressures may be applied to the soft resilient material without any possibility of the gasket becoming displaced. Surrounding the outer end of the shaft and threadedly engaging the annular plate 33 is a cap 34 having an inwardly extending flange 35 thereon disposed in close proximity to the cap 29. The cap 29 is held in place and urged inwardly by means of a coil spring 36 the inner end of which rests on the flange 30 and the outer end of which bears against the flange 35.

Arranged within the inner compartment 10 and nonrotatably connected with the shaft 5 is a block 37 having an axially extending passageway or bore 38 therein adapted to communicate with the bore 9 in the shaft 5. The block 37 is also provided with an axially extending centrally disposed chamber 39 from which lead bores 40 and 41 which communicate at their outer ends with ports or openings 42 and 43 respectively, in the shaft 5. Also leading from the central chamber 39 are bores or passageways 44 and 45 which also communicate at their outer ends with the openings 42 and 43. Inwardly seating ball valves 46 and 47 respectively control the flow of liquid through the passageways 44 and 45.

Loosely arranged within the hollow shaft 5 is a stem 48 which projects into the chamber 39 and has rigidly connected to the inner end thereof a cam like valve member 49. The block 37 is also provided with a radially extending bore or passageway 50 in which is arranged a coil spring 51 which normally urges the cam like valve member 49 into engagement with the walls of the chamber 39. Interposed between the spring 51 and valve 49 is a flanged washer or spring seat 51ª provided with sharp and hardened edges engaging valve 49 and whose outer diameters fits into bore 50. As valve 49 is not hardened, spring seat 51ª will cut into its surface and thus positively held the valve in adjusted position. The outer end of the stem 48 is provided with a tool receiving portion 52 adapted to receive a tool therein for the purpose of adjusting the position of the valve 49. Non-rotatably connected with the outer end of the shaft 5 is a lever arm 53 which is preferably connected with the vehicle axle by means of any suitable connection.

Describing now the operation, and starting with the position of the parts shown in Figures 1 and 2, during compression movement of the vehicle springs and movement of the vehicle body toward the axle, the shaft 5 will be rotated in clockwise direction. The key 7 on the shaft which has considerable clearance in the recess 13 of the piston 12 will move through this clearance space into engagement with the angular face of the recess and such contact will cause the piston 12 to slide outwardly until it comes into pressure contact with the inner cylindrical wall of housing 1, and thereafter the piston will rotate with the shaft but will remain in sealing contact with the housing wall, and the fluid in chamber A will be put under pressure and will be displaced. The fluid pressure acting against the abutment 14 will swing the abutment around the key 15 to bring its inner upper edge against the shaft and to displace its lower inner edge therefrom, thereby closing the passage 17 in the abutment to the chamber A and opening it to the chamber B.

The fluid displaced from chamber A will flow through the shaft port 42, the passage 40 in the valve seat block 37 and through the circumferentially extending port X of the valve 49 and then through the passage 45 past the check valve 47 and through the shaft port 43 to the chamber B, the resistance to fluid flow through this path being controlled by the comparatively shallow valve port X. By adjusting the position of the valve 49 the rate of flow through the valve port X may be regulated. Replenishing fluid will flow from the chamber 10 in the shaft to the chamber B by way of passages 38, 9 and 8, and the clearance space between the key 7 and the trailing side of the piston.

Part of the displaced fluid will also flow through the clearance space between the sides of the piston 12 and abutment 14 and the yieldable disk 24, to the chamber B. By screwing the cap 34 inwardly the cover plate 25 may be flexed for pressure exertion against the disk 24 to regulate the flow resistance through this fluid path just referred to.

Should excessive pressure exist in the chamber A, the spring 23 will yield and some of the displaced fluid will flow past the check valve 21 into the valve housing 18 and through the passage 17 and the space between the abutment 14 and the shaft to the chamber B, the valve structure in the abutment thus acting as a blow-off for relieving excess pressure.

When the movement of the vehicle body toward the axle has been checked, the rebound action of the vehicle springs will tend to rapidly move the vehicle body away from the axle thereby tending to rotate the shaft 5 in the opposite or counter-clockwise direction and the parts will assume the position shown in Figures 1 and 2. With the setting of the valve 49 as shown the passageway 41 through the valve seat block 37 will be closed by the valve so that the fluid displaced from the chamber B must, under ordinary pressure conditions, all flow through the clearance passage provided between the disk 24 and the sides of the piston 12 and the abutment 14 to the chamber A, the replenishing fluid flow to chamber A from the interior of the shaft being by way of the passages 38, 9 and 8 and the clearance between the key 7 and the piston 12. Should abnormal pressure prevail then the spring 23 will yield and part of the flow will be past the check valve 22 through the valve housing 18 and through passage 17 and the clearance space between the abutment 14 and the shaft.

For the purpose of adjusting the position of the cam valve 49 I provide a tool or wrench 54 having a right angularly bent portion 55 adapted to engage a tool receiving portion 52 in the stem 48. This tool 54 at its opposite end is provided with a segmental portion 56 provided with suitable indicia for adjusting the position of the valve and for indicating in which direction the valve is being turned. After adjustment tool 54 is removed and a suitable pipe plug is secured in the opening to prevent leakage.

In the operation just described the passageway 41 has performed no useful function besides that of an auxiliary adjustment. However, it might be explained that this passageway is provided primarily in order to adapt the device for use on either the right hand or left hand side of the vehicle without change or substitution of parts. The only adjustment which is necessary to adapt this device for use on the opposite side of the vehicle is the adjustment of the cam valve 49 to prevent flow of liquid through the passageway 41 instead of through the passageway 40. By rotating valve 49 about 90° so as to close port 40 and open communication with port 41 the action of the device is reversed.

It is evident that the valve might be set for flow through both ports whereby regulation in both directions could be obtained. For example, the valve could be advanced in counter-clockwise direction (Figure 2) to effect a slight overlap of the port 41 by the adjacent shallow end of the valve port X, and then during rebound movement of the vehicle springs, fluid will flow from chamber B to chamber A through a comparatively restricted path which includes the port 41, the restricted end of valve port X, and the port 40 and passage 44. During compression movement of the vehicle springs the fluid will flow from chamber A through port 40 and through a less restricted part of the valve port X and to chamber B mostly through passage 45 and partly through the port 41.

In order to permit a slight unretarded movement of the vehicle body with respect to the axle, the inner disk or plate 4 is provided with a groove 57 which, when the parts are in the normal position, is disposed immediately opposite the piston 12 so as to permit flow of liquid from one side of the piston to the other side thereof without any appreciable checking action. It is, of course, understood that this groove or passageway 57 may be provided in either the plate 4, the plate 24 or in the side wall of the casing 1, and I therefore do not wish my invention to be limited to any particular location of this groove.

The annular disks or plates 4 and 24 are disposed on opposite sides of the piston and abutment and form the opposite ends of the compression chamber or working cylinder and have their working faces flat and disposed at right angles to the axis of the shaft and housing, as hereinbefore described. The main advantage of this construction is to provide sharply defined square corners at the opposite ends of the working cylinder and thereby rendering it unnecessary to machine the piston, abutment or casing to obtain a working fit and thus materially cheapening the construction and adapting the device for quantity production at low cost.

In Figs. 4 and 5 there is disclosed a modification of my invention. In this form of the invention the housing or casing 1 is provided with an annular peripheral shoulder 2' instead of the flange 2. This shoulder is externally threaded as shown in Fig. 4. The cover plate 25' surrounds the shaft and extends across the top of the casing and rests on the annular shoulder 2' at its outer edge. The ring member 31 and annular plate 33 are replaced by a single collar 33' which is angular in cross section and adapted for threaded engagement with the shoulder 2'. The collar 33' is also internally threaded to receive the cap or cover 34. It will now be clear that by screwing the cap or cover 34 inwardly, the cover plate 25' may be flexed inwardly to vary the effective capacity of the working cylinder, that is the clearance between the piston and abutment and the end walls of the working cylinder. In this form of the invention the piston 12 is replaced by a piston 12', shaped as shown in Fig. 5 and which fits into an axially extending angular recess 13' provided in the shaft 5' that has a slight movement with respect to the shaft, the angular recess being slightly larger than that portion of the piston which fits therein. The abutment 14 is replaced by a solid abutment 14' which is shaped as shown in Fig. 5 and is connected with the housing by means of an angular key 15' which fits into an angular recess provided in the abutment, the key and recess being of such size as to permit a slight movement of the abutment with respect to the shaft and casing to compensate for manufacturing irregularities.

It will now be clear that I have provided a hydraulic shock absorber which will accomplish the objects of the invention as hereinbefore stated. Various changes may be made in the details of construction and the arrangement of parts without departing from the spirit of my invention. It is therefore understood that my invention is to be limited only in accordance with the scope of the appended claims.

Having thus described my invention, what I claim is:

1. In a hydraulic check, a housing adapted to contain a liquid, a cover for said housing, a shaft journaled in said housing, a wing piston and an abutment traversing the space between the shaft and housing and forming two variable compartments, a gasket disposed between the cover and housing, an outer annular member for preventing displacement of said gasket and an inner annular member cooperating with said outer annular member to hold said gasket in place.

2. In a hydraulic check, the combination of a housing, a cover for said housing, a shaft journaled in said housing, a trapezoidal key connected with said shaft, a double acting piston traversing the space between said shaft and the wall of said housing and having a recess therein adapted to receive said trapezoidal key, said key and shaft having a passageway leading therethrough and the recess in said piston being considerably larger than said key.

3. In a hydraulic check, the combination of a housing, a cover for said housing, a shaft journaled in said housing, a key connected with said shaft, a double acting piston traversing the space between said shaft and the wall of said housing and having a recess therein adapted to receive said key, said key and shaft having a passageway leading therethrough and the recess in said piston being considerably larger than said key.

4. In a hydraulic check, the combination of a housing, a cover for said housing, a shaft journaled in said housing, a trapezoidal key rigidly connected with said shaft and a double-acting wing piston traversing the space between said shaft and the wall of said housing and having a recess therein adapted to receive said trapezoidal key.

5. In a hydraulic check, the combination of a housing, a cover for said housing, a shaft journaled in said housing, a wing piston arranged within said housing and having a recess therein and traversing the space between said shaft and housing and a lug rigidly secured to said shaft and engaging in the recess formed in said piston whereby the piston will be urged outwardly when the shaft is rotated in either direction.

6. In a shock absorber, the combination of a housing, a shaft journaled in said housing and providing an annular compression chamber, an abutment carried by said housing and traversing the space between said shaft and housing, a wing piston connected with said shaft and having a limited movement with respect thereto and traversing the space between said shaft and housing, a safety valve carried by said abutment adapted to cause excessive pressure in one portion of said compression chamber to be released into another portion thereof.

7. In a shock absorber, the combination of a cylindrical housing, a shaft journaled in said housing and providing an annular compression chamber, an abutment traversing said compression chamber and connected with said housing so as to limit its movement with respect thereto, a piston arranged within said compression chamber and having a recess therein, and a trapezoidal lug rigidly connected with said shaft and projecting into the recess in the piston.

8. In a hydraulic shock absorber, the combination of a cylindrical drawn metal housing, an annular member non-rotatably fitted within said housing and constituting a liner for the inner end thereof, a shaft journaled axially of said housing and defining an annular compression chamber, a piston connected with said shaft, an abutment connected with said housing, the working face of said annular member being machined and disposed at right angles to the axis of said housing whereby to provide a smooth working fit with said piston and abutment, and a trapezoidal lug attached to said shaft and engaging said piston.

9. In a hydraulic shock absorber, the combination of a drawn metal cylindrical housing of considerable depth, a reinforcing ring member non-rotatably arranged within said housing and constituting a liner for the inner end thereof, a shaft journaled in said housing and cooperating with said casing to define a compression chamber, a piston traversing said compression chamber and connected with said shaft, the working face of said ring member being flat and disposed at right angles to the axis of said shaft, said piston having a surface adapted to engage a surface of a V shaped groove extending axially in said shaft.

10. In a hydraulic check comprising a casing, a shaft journaled in said casing, a piston connected with said shaft, an abutment in said casing and dividing the space in said casing into a pair of working compartments, a cover for said casing, an opening in said cover serving as a bearing for said shaft, packing surrounding said shaft at the outer part of said bearing, resilient means for compressing said packing, a passage between the aforesaid working compartments, a recess in said passage, a valve in said recess having an axially extending stem, resilient means for holding said valve in position, and means associated with said valve adapted to engage an adjusting tool inserted in a part of said recess.

11. In a hydraulic check comprising a casing, a shaft journaled in said casing, a piston connected with said shaft, an abutment dividing the space in said casing into working compartments, an opening in said casing serving as a bearing for said shaft, a passage between the working compartments, a recess in said passage, a cylindrical valve in said recess, said valve machined to provide a passage, a resilient means engaging said valve to hold it in position, and means associated with said valve for engaging an adjusting tool.

12. In a hydraulic check comprising a casing, a shaft journaled in said casing, a piston connected with said shaft, a partition forming working compartments within said casing, a bearing for said shaft, a passage between the working compartments having a recess, and a valve in said recess, the aforesaid piston having a diagonally extending surface adapted to engage a surface of a V shaped groove in said shaft.

13. In a hydraulic check comprising a casing, a shaft journaled in said casing, a piston connected with said shaft, a partition forming working compartments within said casing, a bearing for said shaft, a passage between the working compartments having a recess, and a valve in said recess, the aforesaid partition having a diagonally extending surface adapted to engage a surface of a substantially triangular key secured in said casing.

14. In a hydraulic check, the combination of a housing, a cover for said housing, a shaft journaled in said housing, a key secured to said shaft, and a wing piston traversing the space between said shaft and a wall of said housing and having a recess therein adapted to receive said key, said key having a passage therethrough for a fluid.

15. In a hydraulic check, the combination of a housing providing a cylindrical hydraulic working space, a shaft journaled in said housing, a piston traversing the space between said shaft and the wall of said housing, and a coupling connection between said shaft and piston including inclined surfaces arranged to cooperate to cause shift of said piston radially outwardly against the wall of the housing upon rotation of said shaft.

16. In a hydraulic check, the combination of a casing providing a cylindrical hydraulic working chamber, a shaft journaled in said casing, a piston structure extending between said shaft and casing wall, and a coupling connection between said shaft and piston structure arranged to cause radial shift of said piston against the casing wall when the shaft is rotated, there being a passageway through said coupling connection for the flow of fluid to the trailing side of said piston structure from the interior of said shaft.

17. In a hydraulic check, the combination of a casing providing a cylindrical hydraulic working space, a shaft journaled in said casing, a piston structure between said shaft and casing wall adapted for limited bodily radial movement, and a coupling connection between the shaft and piston structure arranged to cause radial outward shift of said piston structure for sealing engagement with the casing wall during initial rotary movement of said shaft in either direction.

18. In a hydraulic check, the combination of a casing, a shaft journaled in said casing, a piston structure and an abutment structure in said casing cooperating with said shaft to divide said casing into two hydraulic working chambers, a passageway through said shaft for flow of displaced hydraulic fluid from one of said chambers to the other and a check valve in said passage for preventing reverse flow therethrough, a second passageway through said shaft for the flow of displaced fluid from said other chamber to the first mentioned chamber and a check valve for preventing reverse flow through said passage, and a manually adjustable valve for regulating the flow through said passages.

19. In a hydraulic check, the combination of a casing, a shaft structure journaled in said casing, a piston structure and an abutment structure in said casing cooperating with said shaft structure to divide said casing into two hydraulic working chambers, there being two passageways through said shaft structure for the flow of displaced fluid from one chamber to the other as the shaft structure is oscillated, a check valve in each of said passages permitting flow therethrough in only one direction, a valve chamber in said shaft structure common to both of said passages, and a valve in said valve chamber adjustable to regulate the flow through said passages.

20. In a hydraulic check, the combination of a casing, a shaft structure journaled in said casing, a piston structure movable with the shaft, an abutment structure in said casing, said shaft structure and said piston and abutment structure dividing said casing into hydraulic working chambers, passageways through said shaft structure for the flow of displaced fluid from one chamber to the other as the shaft oscillates, a relief passageway through said abutment structure and a safety valve for controlling said relief passage, said abutment structure being arranged to be rocked by the fluid pressure to alternately connect said relief passageway with said chambers for flow of displaced fluid as the shaft oscillates.

COURTNEY N. MITCHELL.